Patented Aug. 15, 1944

2,355,993

UNITED STATES PATENT OFFICE 2,355,993

LOW TEMPERATURE LUBRICANTS

John D. Morgan, South Orange, N. J., assignor to Cities Service Oil Company, New York, N. Y., a corporation of Pennsylvania No Drawing. Application September 16, 1942, Serial No. 458,564

16 Claims. (Cl. 252—59)

This invention relates to improvements in the method of lubricating metallic bearing surfaces of various types of mechanisms at excessively low temperatures, and to an improved lubricant therefor.

More particularly, the improved lubricant preferably consists of a single compound adapted to be an effective lubricant at extremely low temperatures of for example about 100° F. below freezing temperature, and also to be effective at high temperatures of the order of 100° or 200° F. Ordinary lubricating oils do not provide effective lubricants at such low temperatures or over such wide temperature ranges.

The need for lubricants of the type of the present invention is apparent from the fact that aircraft and other mechanisms are operated at widely different temperature within very short periods of time. For example, an aeroplane may take off at a ground temperature of 100° F. or 140° F. and within a matter of minutes be operating at temperatures of the order of minus 40° F. (72° F. below freezing) or lower. Other mechanisms must be used almost continuously at low temperatures, as for example motor vehicles used in the Arctics. Sometimes it is impossible to operate a mechanism in a frigid climate or under conditions of extreme cold until the bearings have been warmed artificially.

The primary object of the present invention is to provide a method for lubricating metal bearing surfaces and to provide a lubricant which will avoid the above difficulties encountered in the use of ordinary lubricating oils.

The present invention includes the discovery that the monopropyl benzenes have the unique properties required for the lubrication of bearing surfaces over wide temperature ranges of the type referred to above and at extremely low temperatures, although it is ordinarily not expected that a material which would be a satisfactory lubricant at a temperature of minus 70° F. would also be satisfactory, and have a satisfactory viscosity when used at temperatures of 100° F. or 200° F.

The monopropyl benzenes, cumene (isopropyl benzene), and isocumene (n-propyl benzene) have a load-carrying capacity about equal to that of a Pennsylvania motor oil (30 SAE). Cumene, the preferred lubricant, has the following properties:

| | |
|---|---|
| Viscosity at minus 40° F_____centistokes__ | 4.29 |
| Viscosity at 0° F_____do____ | 2.48 |
| Viscosity at 100° F_____do____ | 0.90 |
| Viscosity at 200° F_____do____ | 0.58 |
| Boiling point_____°F__ | 308 |
| Melting point_____°F__ | Minus 142 |
| Specific gravity_____ | 0.864 |
| Refractive index_____ | 1.4930 |
| Chemical stability_____ | Excellent |

Isocumene has properties comparable to that of cumene, the boiling point being slightly higher and the melting point slightly lower. Both compounds are colorless liquids insoluble in water.

The improved lubricant according to the present invention may be applied directly to the bearings to be lubricated in any suitable manner commonly used for the application of liquid mineral lubricating oils. The improved lubricant is preferably used undiluted with other materials, but may be applied for certain types of bearings as a grease. Suitable greases may be made from calcium, aluminum or sodium soaps as thickening agents. The soaps may be the stearate, oleate or derivatives of other suitable fatty acids. A suitable grease may be made by the use of from 4% to 20% of soap or other thickening agent, the remainder being cumene, isocumene or a mixture of the cumenes. Up to the present time, it has been found impossible to make a grease with lithium soap. Greases which are to be used under extreme pressure conditions should include approximately 1% of an extreme pressure agent such as "Polane," tricresyl phosphate, sulfurized tricresyl phosphite, a sulfurized animal oil, or other suitable "E. P." agent. The lubricant either when used alone or in a grease composition may include tricresyl phosphite, triethanolamine, or other known anti-corrosion agent, especially where the bearings are considerably exposed to the action of the air or other oxidizing or corrosive atmosphere.

While the improved lubricant of the present invention provides effective lubrication over a wide temperature range including extremely low temperatures, it may be found desirable to provide a definite viscosity curve over a specific, relatively narrow temperature range, in which case the cumene of the present invention may be blended with decalin or tetralin in proportions adapted to give the desired viscosity curve. In making these compositions, the major part of the mixture is preferably comprised of cumene with the balance made up of decalin or tetralin.

While the features of the present invention have been described and illustrated in connection with certain examples, it is to be understood that the invention is not to be restricted except in accordance with the scope of the prior art and of the appended claims.

Having described the invention in its preferred form what is claimed as new is:

1. A lubricant for metallic bearing surfaces having viscosity characteristics adapted to provide effective lubrication at extremely low temperatures as well as at temperatures above normal atmospheric temperature, consisting essentially of a monopropyl benzene and a small proportion of an extreme pressure agent adapted to impart extreme pressure properties to the lubricant.

2. A lubricant as defined by claim 1, consisting essentially of isopropyl benzene.

3. A lubricant as defined by claim 1 consisting essentially of n-propyl benzene.

4. The method of lubricating bearings of mechanisms operated at sub-zero temperatures comprising applying to the bearings a fluid lubricant consisting essentially of a monopropyl benzene.

5. The method of lubricating bearings as defined by claim 5 in which said monopropyl benzene is cumene.

6. The method of lubricating bearings as defined by claim 5 in which said monopropyl benzene is isocumene.

7. The method of lubricating relatively moving bearing surfaces over temperature ranges such that an ordinary lubricating oil will be unable to provide effective lubrication, which comprises maintaining on such bearing surfaces a lubricant preeminently consisting of cumene.

8. In the lubrication of mechanisms operated over wide temperature ranges of from approximately minus 70° F. to upwards of 100° F., a lubricant consisting essentially of a monopropyl benzene applied to the bearings of such mechanism.

9. The method of lubricating relatively moving bearing surfaces over temperature ranges of approximately 270° F. extending to temperatures as low as approximately minus 70° F., these ranges being such that an ordinary lubricating oil will be unable to provide effective lubrication, which comprises maintaining on such bearing surfaces a lubricant, the major proportion of which is a monopropyl benzene.

10. The method as defined by claim 9 in which cumene comprises a major proportion of the lubricant.

11. The method as defined by claim 9 in which said lubricant is comprised essentially of cumene containing a relatively small proportion of an extreme pressure agent sufficient to greatly increase the load-carrying capacity of the cumene.

12. A grease for lubricating metallic bearing surfaces comprising from about 4% to about 20% of a thickening agent, and from about 96% to about 80% of a monopropyl benzene.

13. A grease for metallic bearing surfaces comprised mainly of a monopropyl benzene and a thickening agent in sufficient proportion to form a grease.

14. A grease for lubricating metallic bearing surfaces comprised mainly of a monopropyl benzene, a thickening agent and an extreme pressure agent.

15. A lubricant for metallic bearing surfaces having viscosity characteristics adapted to provide effective lubrication at extremely low temperatures as well as at temperatures above normal atmospheric temperature, consisting essentially of a monopropyl benzene containing a small proportion of an anti-corrosion agent for protecting metal surfaces.

16. The method of lubricating relatively moving bearing surfaces, which comprises maintaining on such bearing surfaces a lubricant preeminently consisting of a monopropyl benzene containing a small proportion of an anticorrosion agent for protecting the bearing surfaces.

JOHN D. MORGAN.